(12) United States Patent
Ogawa

(10) Patent No.: US 7,273,547 B2
(45) Date of Patent: Sep. 25, 2007

(54) EXTERNAL TYPE FILTRATION DEVICE

(75) Inventor: Soichi Ogawa, Tokyo (JP)

(73) Assignee: Suisaku Co., Ltd., Tokyo (JP)

( * ) Notice: Subject to any disclaimer, the term of this patent is extended or adjusted under 35 U.S.C. 154(b) by 313 days.

(21) Appl. No.: 10/380,633

(22) PCT Filed: Aug. 6, 2002

(86) PCT No.: PCT/JP02/08032

§ 371 (c)(1),
(2), (4) Date: Oct. 10, 2003

(87) PCT Pub. No.: WO03/013233

PCT Pub. Date: Feb. 20, 2003

(65) Prior Publication Data

US 2004/0050759 A1    Mar. 18, 2004

(30) Foreign Application Priority Data

Aug. 7, 2001   (JP) ............................. 2001-238815

(51) Int. Cl.
*A01K 63/04* (2006.01)
(52) U.S. Cl. ................... 210/167.27; 119/259
(58) Field of Classification Search ........ 119/259–262, 119/226–227; 210/416.2, 169
See application file for complete search history.

(56) References Cited

U.S. PATENT DOCUMENTS 2,652,151 A    9/1953  Legus
2,737,490 A *  3/1956  Lambertson ................. 210/169
3,152,987 A * 10/1964  Gare ...................... 210/167.25
3,513,978 A    5/1970  Newsteder
3,525,435 A *  8/1970  Conner, Jr. .................. 210/169
4,512,885 A    4/1985  Willinger
4,783,258 A   11/1988  Willinger et al.
5,160,607 A   11/1992  Thiemer et al.
5,290,436 A *  3/1994  Danner ....................... 210/169
5,522,987 A    6/1996  Bresolin

FOREIGN PATENT DOCUMENTS

| DE | 69 48 723    | 4/1970  |
| JP | 91117782     | 11/1989 |
| JP | 9-294502     | 11/1997 |
| JP | 11-289911    | 10/1999 |
| JP | 2000-270711  | 10/2000 |
| TW | 412923       | 11/2000 |

* cited by examiner

*Primary Examiner*—Terry K. Cecil
(74) *Attorney, Agent, or Firm*—Arent Fox LLP

(57) ABSTRACT

The present invention relates to a filtering apparatus including a filter device externally hitched on a wall surface of an aquarium. A water pump pumps water stored in the aquarium into the filter device. The filter device is formed so that the water pumped from the water pump is divided into a first flow which is returned into the aquarium unfiltered, and a second flow which is filtered through a filter element and then returned into the aquarium in dependence on a siphon effect.

15 Claims, 12 Drawing Sheets

EXTERNAL TYPE FILTRATION DEVICE

FIELD OF THE INVENTION

The present invention relates to an outside-type filtering apparatus including a filter device externally hitched on a wall surface of an aquarium or water tank for breeding goldfishes, tropical fishes, saltwater fishes and the like, so that water within the aquarium is circulated and filtered.

BACKGROUND ART

In general, there is a known outside-type filtering apparatus for filtering water in a aquarium to purify it in order to breed and rear aquarium fishes such as goldfishes, tropical fishes and the like in the aquarium, which includes a filter device which is externally hitched and supported on a wall surface of the aquarium, and a water pump which is connected to the filter device, so that water in the aquarium is forcibly circulated through the filter device where it is filtered, and the filtered water is returned into the aquarium (for example, see the specification of U.S. Pat. No. 4,512,885).

It should be noted here that in such outside-type filtering apparatus, the filter device which is a main member of the apparatus can be mounted outside the aquarium. Therefore, the outside-type filtering apparatus is generally and widely utilized, because there are advantages that the filtering apparatus cannot reduce an effective volume within the aquarium and moreover, cannot deteriorate the sight within the aquarium, and that the maintenance such as the exchange of parts of the filtering apparatus and the cleaning of the filtering apparatus is easy.

In the conventionally known outside-type filtering apparatus, however, the water pumped into the aquarium by the water pump is pressurized and fed into the filter device by the water pump, and the total amount of the water is passed through the filter element for filtration.

In the conventional filtering apparatus, however, because the pressurized water from the water pump is passed, as it is, through the filter element, whereby it is filtered, the following disadvantage is encountered: The water is difficult to flow equally over the entire region of the filter element (the water flows partially relative to the filtering surface), thereby bringing about a reduction in filtering efficiency and further causing the partial clogging of the filter element. Such disadvantage tends to be increased, as the filtering area of the filter element is increased.

Because the total amount of the pressurized water from the water pump is passed through the filter element, the following problem is also encountered: The flow speed of the water flowing through the filter element is too rapid, which is inappropriate for propagation of aerobic microorganisms required for the purification of the water in the filter element, thereby bringing about a further reduction in filtering efficiency in cooperation with the above-described disadvantage and problem to hasten the exchange and maintenance frequencies for the filter element.

DISCLOSURE OF THE INVENTION

Therefore, it is an object of the present invention to provide a new outside-type filtering apparatus, wherein water to be passed through the filter element for filtration by a water sucking effect by depressurizing the inside of a filter case based on a siphon effect causes, so that the water flows equally over the entire region of the filter element, whereby the filtering efficiency is enhanced remarkably and moreover, the partial clogging of the filter element can be prevented to reduce the maintenance frequency for the filtering apparatus more remarkably than the conventional filtering apparatus.

It is another object of the present invention to provide a new outside-type filtering apparatus, wherein the filter element is pressed for the propagation of aerobic microorganisms required for the purification of water, and the filtering and purifying efficiency of the water can be further enhanced by the water filtering action in the filter element and the organically purification of the water by the aerobic microorganisms.

To achieve the above object, according to a first aspect and feature of the present invention, there is provided an outside-type filtering apparatus, comprising a filter device detachably supported in an externally hitched manner on a wall surface of a aquarium, and a water pump for pumping water stored in the aquarium into the filter device, the filter device being formed, so that the water pumped from the water pump is stored in the filter device, and the stored water is filtered through a filter element by the depressurization of the inside of a filtering chamber caused by a siphon effect, and the filtered water is then returned into the aquarium. With such feature, the water is passed through the filter element for filtration by the water sucking effect by depressurizing the inside of the filter case based on the siphon effect, so that the water flows equally over the entire region of the filter element. Thus, it is possible to enhance the filtering efficiency remarkably and moreover, to prevent the partial clogging of the filter element to reduce the maintenance frequency for the filtering apparatus more remarkably than the conventional filtering apparatus.

To achieve the above object, according to a second aspect and feature of the present invention, there is provided an outside-type filtering apparatus, comprising a filter device detachably supported in an externally hitched manner on a wall surface of a aquarium, and a water pump for pumping water stored in the aquarium into the filter device, the filter device being formed, so that the water pumped from the water pump is stored in the filter device, and the stored water is divided into a first flow which is returned into the aquarium as remaining unfiltered, and a second flow which is filtered through a filter element by the depressurization of a filtering chamber by a siphon effect and then returned into the aquarium. With such feature, the unfiltered water can be allowed to flow over the entire region of the filter element with its flow speed suppressed and moreover, the water sucked by the siphon effect can be passed through the filter element, whereby it can be filtered by sucking. As a result, the water filtering efficiency can be enhanced remarkably, and moreover, the propagation of aerobic microorganisms in the filter element can be promoted, leading to a remarkable enhancement in water filtering and purifying efficiency.

Further, to achieve the above object, according to a third aspect and feature of the present invention, the filter device includes a filter case, which is provided, in an inside thereof, with a water storage chamber in which water pumped by the water pump is stored, a filtering chamber which is formed so that water overflowing from the water storage chamber is received therein, and a portion of the received water is permitted to overflow and returned into the aquarium as remaining unfiltered, and the remaining water is filtered through the filter element, and a drain pipe for dropping the filtered remaining water into the aquarium by sucking by the siphon effect. With such feature, the same effect as in the second feature can be provided and moreover, it is possible to simplify the structure of the filter device and to provide the compactness of such structure.

Yet further, to achieve the above object, according to a fourth aspect and feature of the present invention, a purifying agent such as activated carbon is provided in the filter case for purifying the water received in the filter case. With such feature, the same effect as in the first, second or third feature can be provided and moreover, the purification of the water by the purifying agent can be also used.

BRIEF DESCRIPTION OF THE DRAWINGS

FIG. 1 is a perspective view of a filtering apparatus set in a aquarium;

FIG. 2 is an exploded perspective view of the filtering apparatus;

FIG. 3 is a front view of the filtering apparatus, taken in the direction of an arrow 3 in FIG. 1;

FIG. 4 is a plan view of the filtering apparatus, taken in the direction of an arrow 4 in FIG. 3;

FIG. 5 is a sectional view taken along a line 5-5 in FIG. 4;

FIG. 6 is a sectional view taken along a line 6-6 in FIG. 3;

FIG. 7 is a sectional view taken along a line 7-7 in FIG. 3; and

FIG. 8 is a sectional view taken along a line 8-8 in FIG. 3.

FIG. 9 is a perspective view of a filtering apparatus set in a aquarium;

FIG. 10 is an exploded perspective view of the filtering apparatus;

FIG. 11 is a front view of the filtering apparatus, taken in the direction of an arrow 11 in FIG. 9; and FIG. 12 is a sectional view taken along a line 12-12 in FIG. 11.

DETAILED DESCRIPTION OF PREFERRED EMBODIMENTS

The present invention will now be described by way of embodiments of the present invention shown in the accompanying drawings.

A first embodiment of the present invention will first be described with reference to FIGS. 1 to 8.

Figure 1:
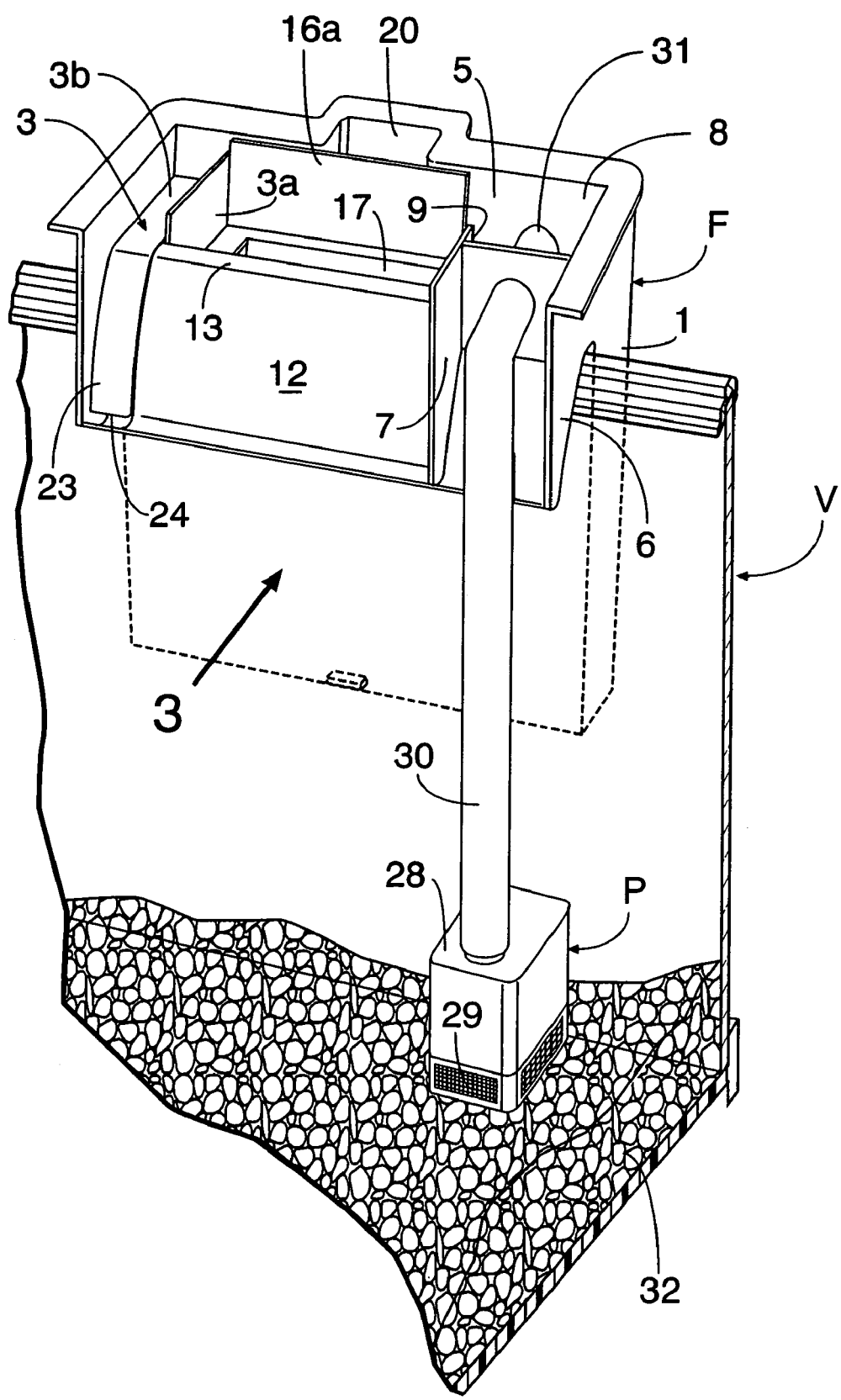
FIGS. 1 to 8 show a first embodiment of the present invention.
Figure 2:
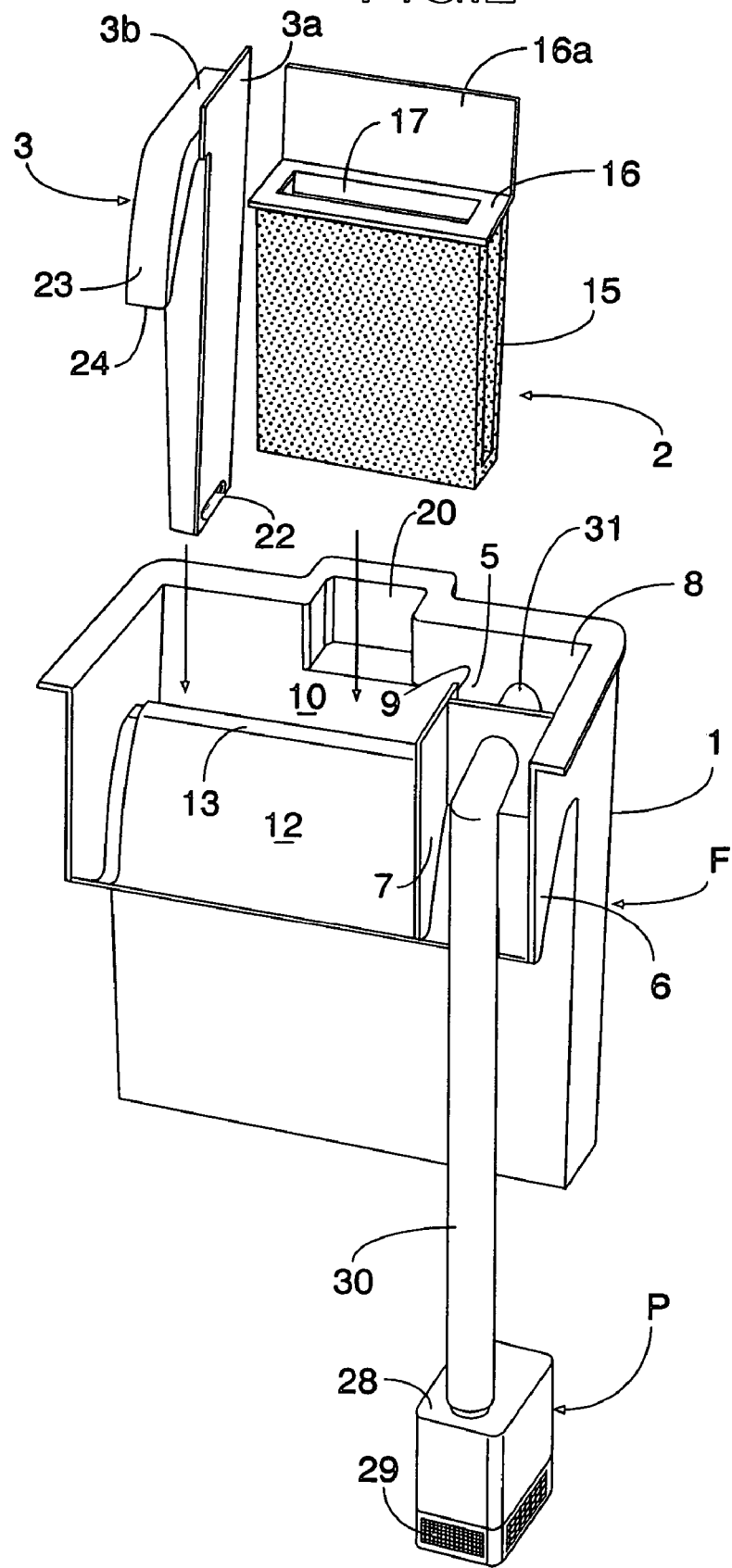
Figure 3:
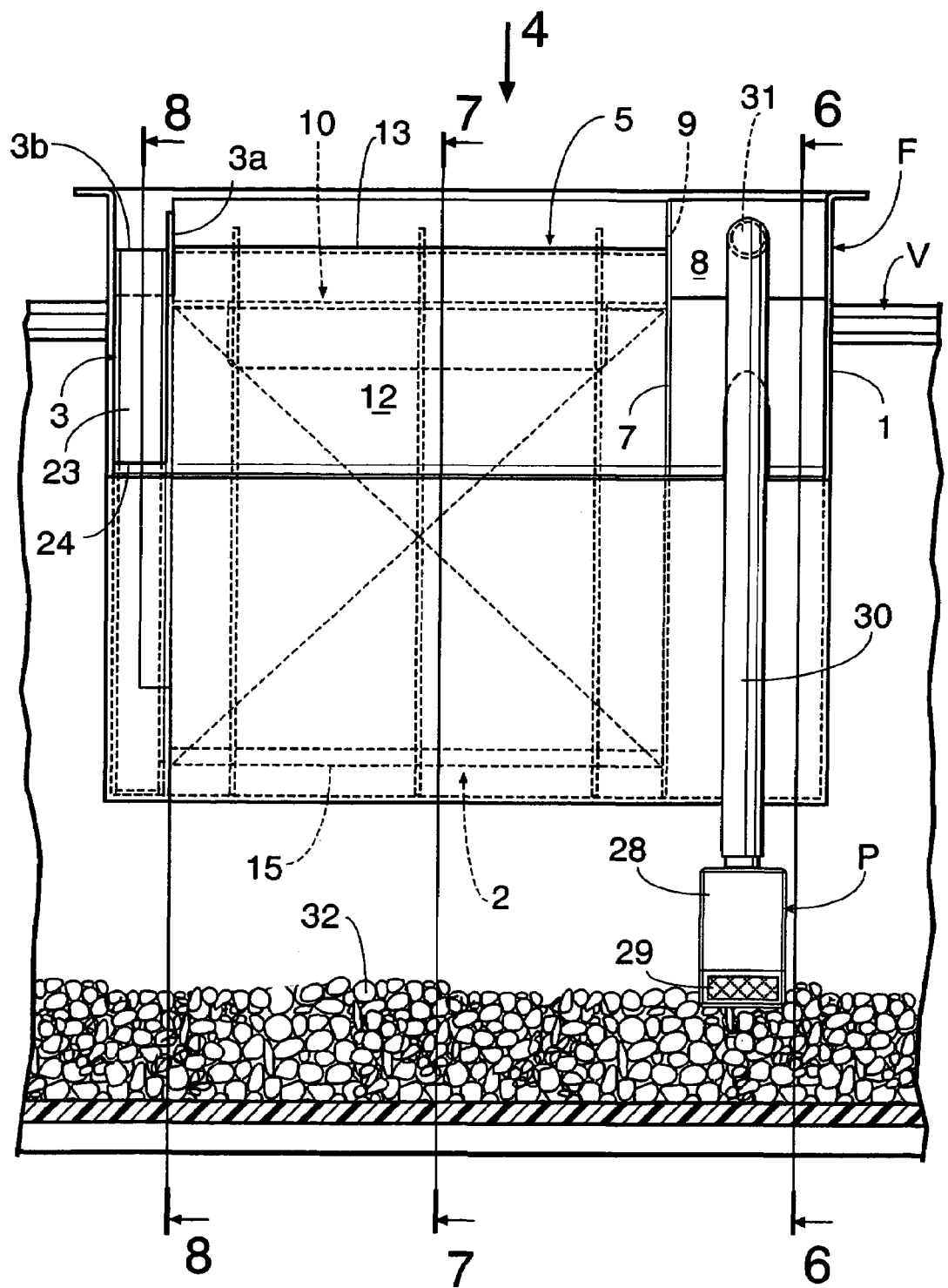

As shown in FIGS. 1 and 2, an outside-type filtering apparatus according to the present embodiment is of a type externally hitched on a aquarium V and is comprised of a filter device F externally hitched on a wall surface of the aquarium V, and a water pump P for circulating water in the aquarium V into the filter device F.

Figure 4:
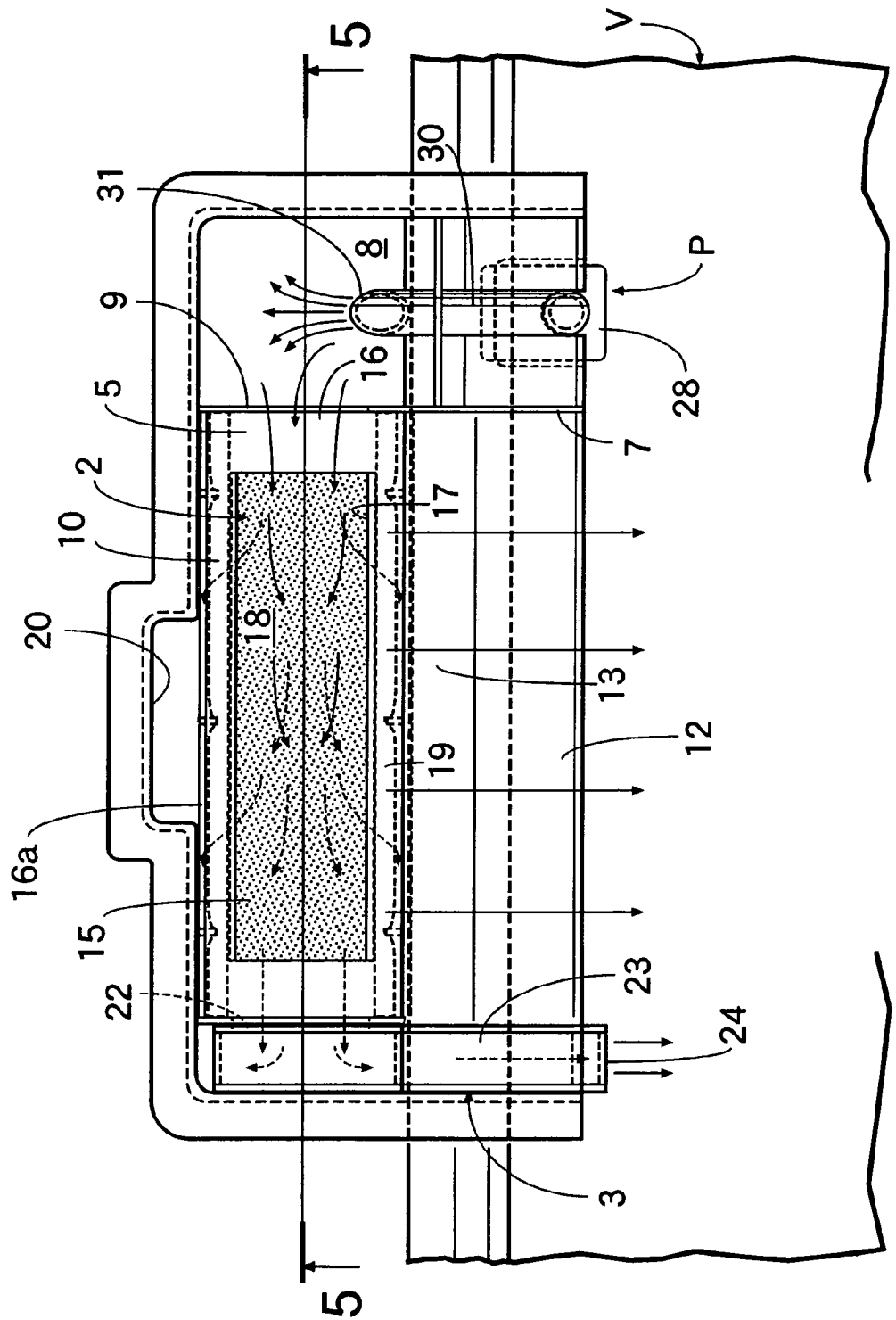
Figure 5:
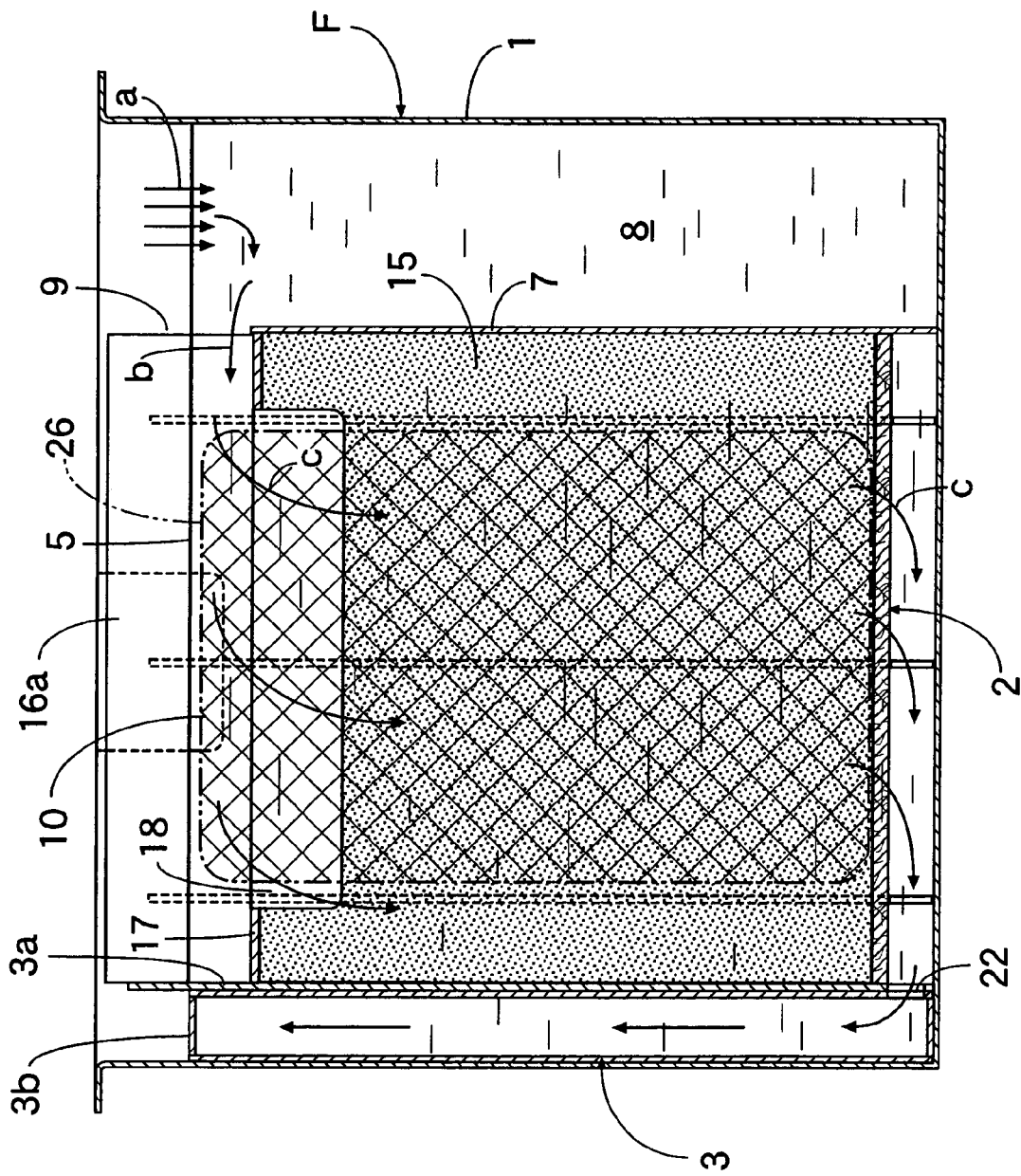

The filter device F includes a filter case 1, and a filter element unit 2 and a drain pipe 3, which are detachably mounted to the filter case 1. The filter case 1 is formed of a transparent hard synthetic resin material. The filter case 1 is formed into a flat box-shape with an access port 5 opened in an upper surface, and a downward-turned hook-shaped hitch portion 6 is integrally formed on a front surface of the filter case 1 over the entire width thereof. As shown in FIG. 1, the hitch portion 6 is formed so that it can be detachably hitched on an upper edge of the aquarium V. As shown in FIGS. 4 and 5, a vertical partition wall 7 is fixed in the filter case 1 and offset to one side (to a right side in FIGS. 4 and 5) in a laterally widthwise direction to partition the inside of the filter case 1 laterally. A rectangular tubular water storage chamber 8 is defined on widthwise one side of the filter case 1 by the partition wall 7, and a filtering chamber 10 having a volume larger than that of the water storage chamber 8 is defined on the other side by the partition wall 7. A flow-in port 9 is opened in an upper portion of the partition wall 7, so that water stored in the water storage chamber 8 can flow through the flow-in port 9 into the filtering chamber 10.

As shown in FIGS. 1 to 4, an outlet 31 of a water-feed pipe 30 extending from the water pump P, which will be described hereinafter, faces to an upper portion of the inside of the water storage chamber 8, so that unpurified water pumped into the aquarium V by the water pump P can be stored in the water storage chamber 8.

Figure 7:
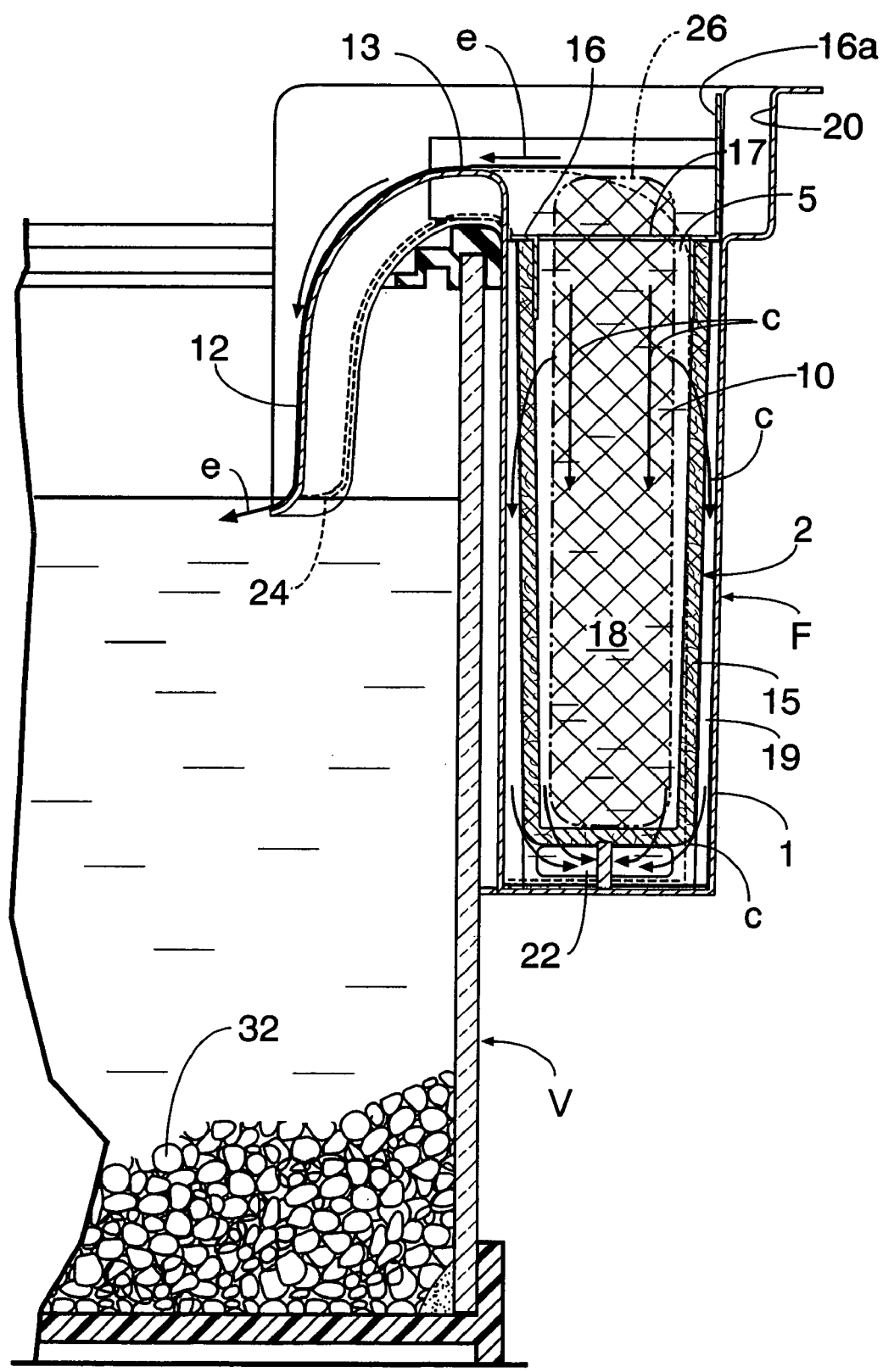

As clearly shown in FIG. 2, the filter element unit 2 and the drain pipe 3 can be withdrawably and individually mounted in parallel to each other in the filtering chamber 10 from an opening in an upper portion of the filtering chamber 10. A skirt-shaped water-flow wall 12 is integrally formed on a front surface of the filtering chamber 10 in the filter case 1 between one (a partition wall) 3a of sidewalls of the drain pipe 3 and the partition wall 7. The water-flow wall 12 is of a curved shape in longitudinal section convex outwards, as shown in FIG. 7, and a substantially horizontal overflow wall 13 is formed at an upper edge of the water-flow wall 12, so that the water overflowing from the filtering chamber 10 flows over the overflow wall 13 and downwards along the water-flow wall 12 back into the aquarium V.

The filter element unit 2 withdrawably mounted in the filtering chamber 10 comprises a filter element 15 formed flatly in a longitudinal direction into a U-shape in longitudinal section gradually convergent downwards, and a ceiling plate 16 fixed to an open upper surface of the filter element 15. An inlet 17 is opened in the ceiling plate 16 to communicate with the inside of the filter element 15, and a guide wall 16a is integrally provided to rise on a rear edge of the ceiling plate 16. The element unit 2 can be withdrawably mounted in the filtering chamber 10 from its open upper surface by grasping the guide wall 16a. The filter element 15 of the filter element unit 2 is formed by bending a filter plate of a porous synthetic resin into a U-shape, and divides the inside of the filtering chamber 10 into an inner unpurified water chamber 18 and an outer purified-water chamber 19 (see FIG. 7). A recess 20 is defined centrally in an upper portion of a rear wall of the filter case 1 to facilitate the inserting/withdrawing operation for the filter element unit 2, so that the guide wall 16a is easily held by fingers (see FIGS. 1 and 2).

The drain pipe 3 withdrawably mounted on laterally one side (a left side in FIGS. 1 and 2) in the filter case 1 is formed into a rectangular tubular shape gradually convergent downwards, and the sidewall 3a of the drain pipe 3 adjoining the element unit 2 forms a partition wall which isolates the filtering chamber 10 and the drain pipe 3 in a water-tight manner. An inlet 22 is opened in a lower portion of the sidewall (partition wall) 3a of the drain pipe 3, so that the inside of the drain pipe 3 is put into communication with the purified-water chamber 19 through the inlet 22. The drain pipe 3 has a nose portion 23 integrally formed at its upper portion to extend along the water-flow wall 12 of the filter case 1, and a drain port 24 is opened in a downward facing manner in a lower end of the nose portion 23. Thus, the water purified by filtering in the filtering chamber 10 is discharged through the inlet 22 into the drain pipe 3 and returned through the drain port 24 into the aquarium V.

Figure 6:
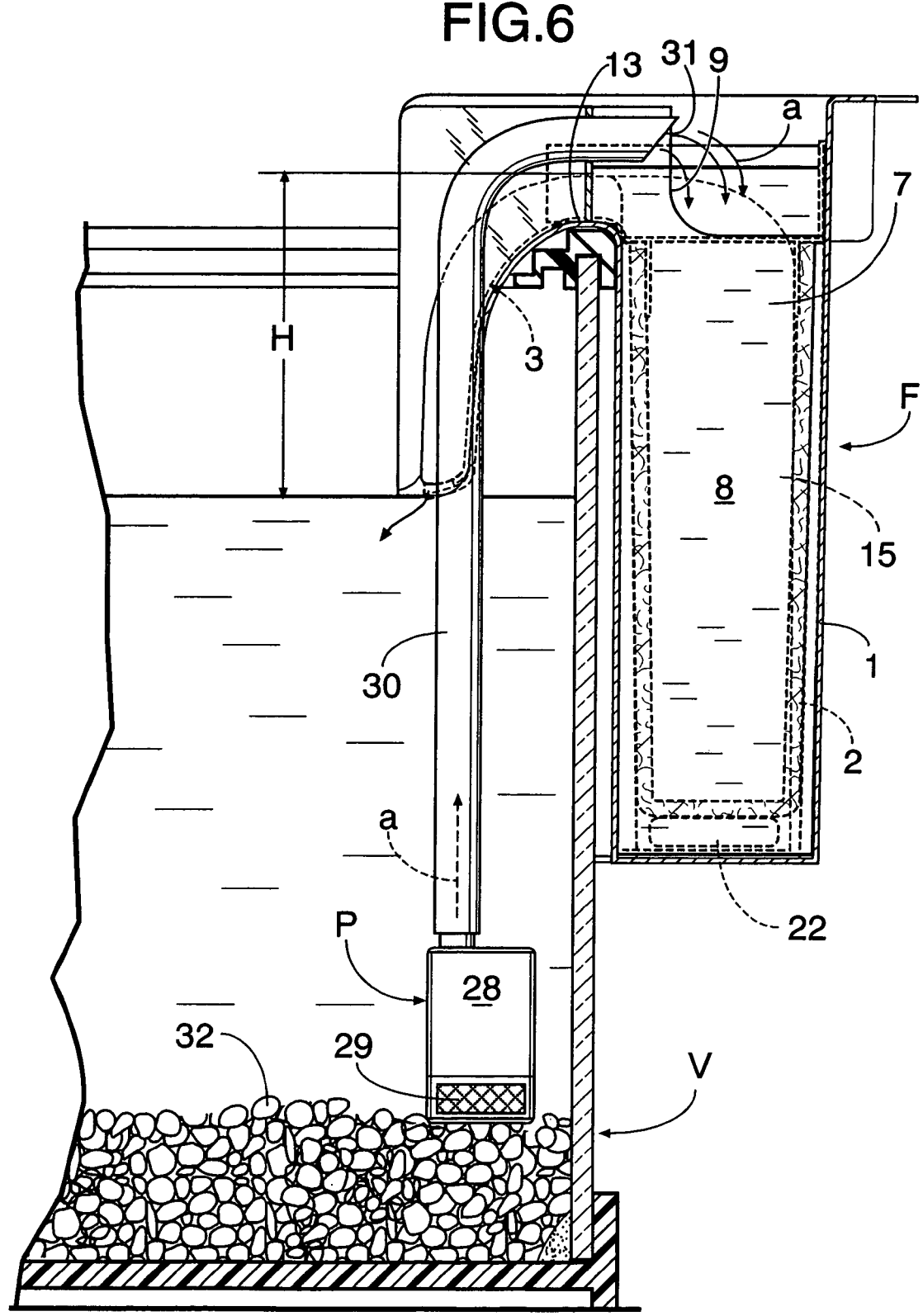
Figure 8:
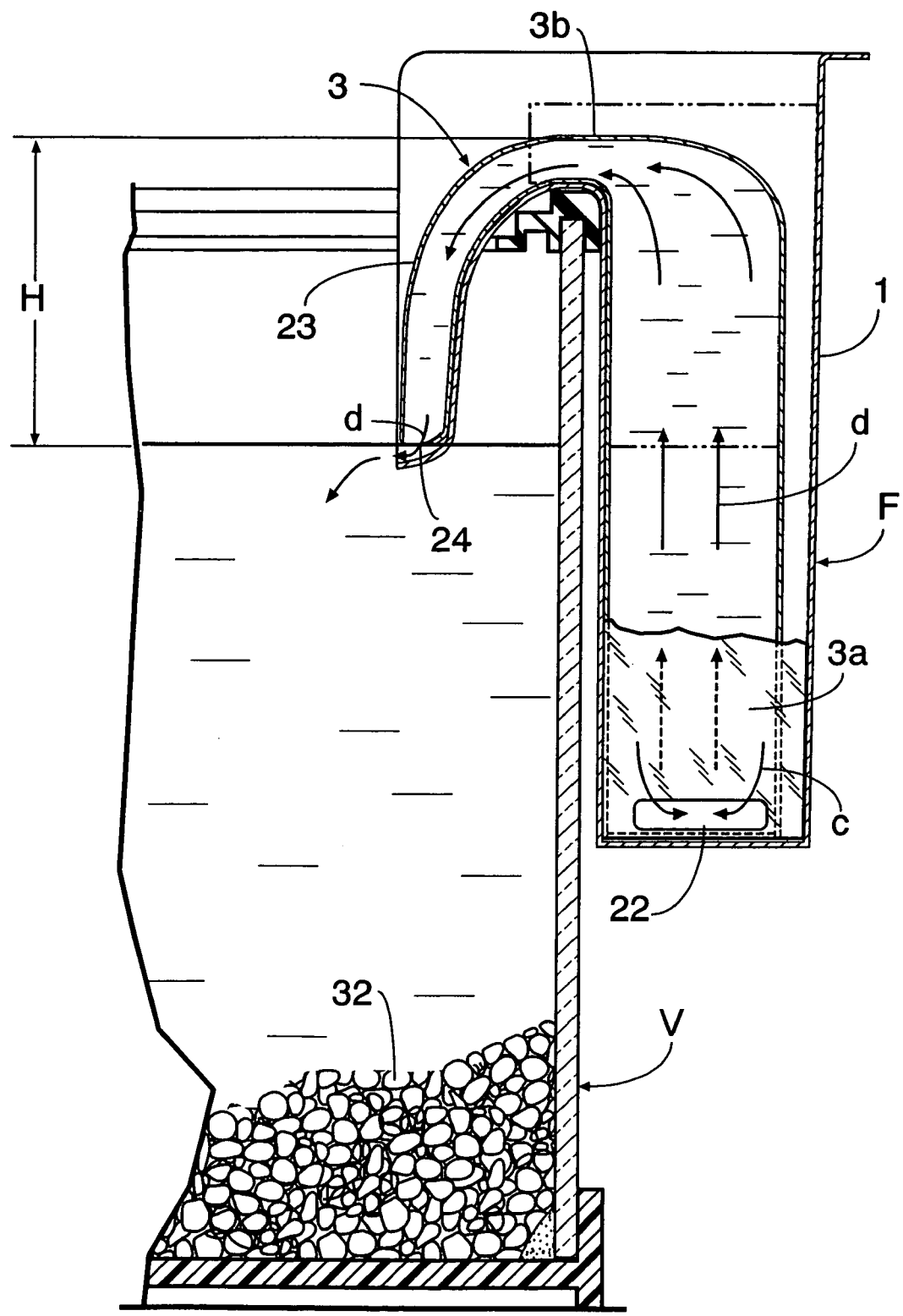
Figure 9:
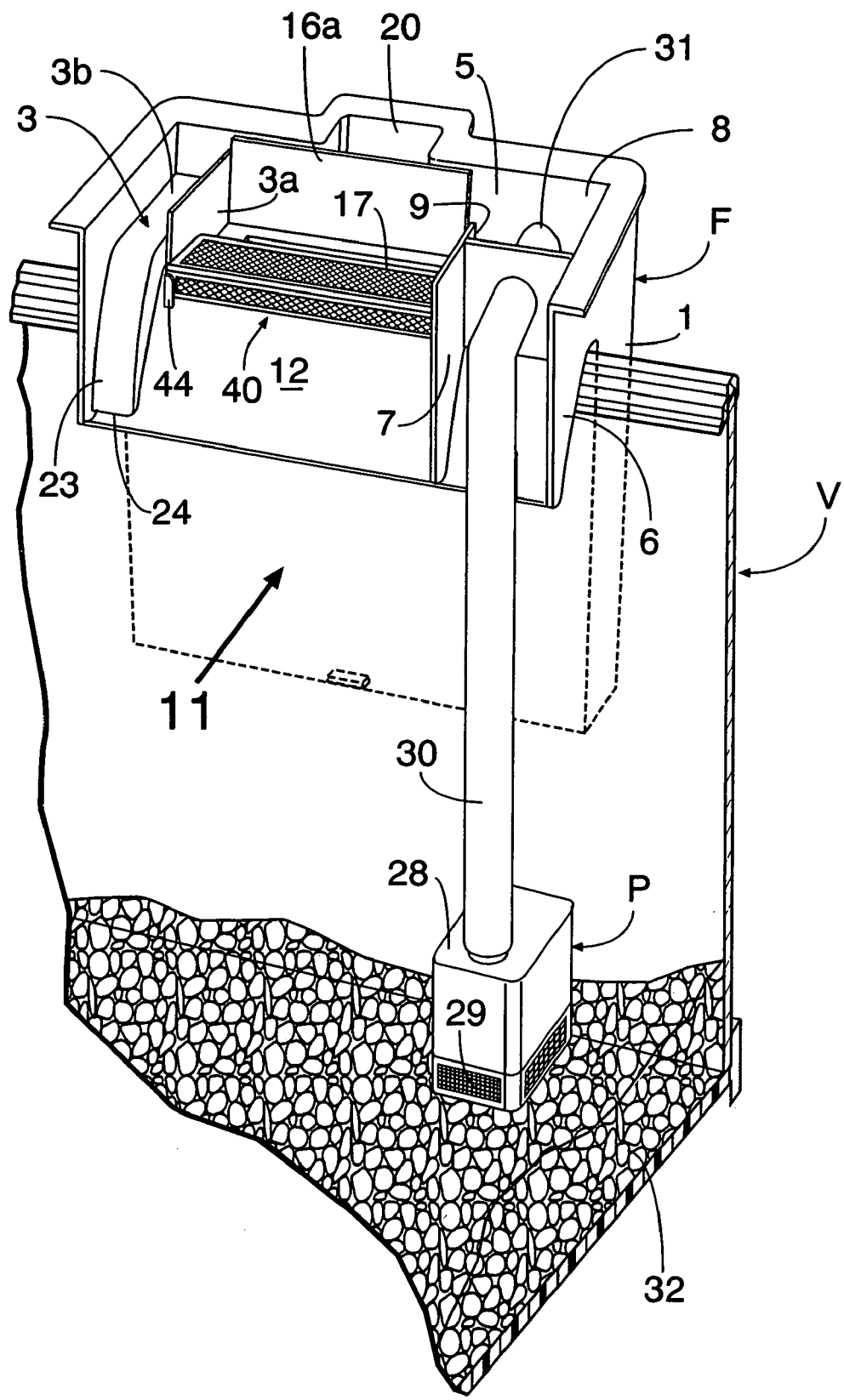
FIGS. 9 to 12 show a second embodiment of the present invention.
Figure 10:
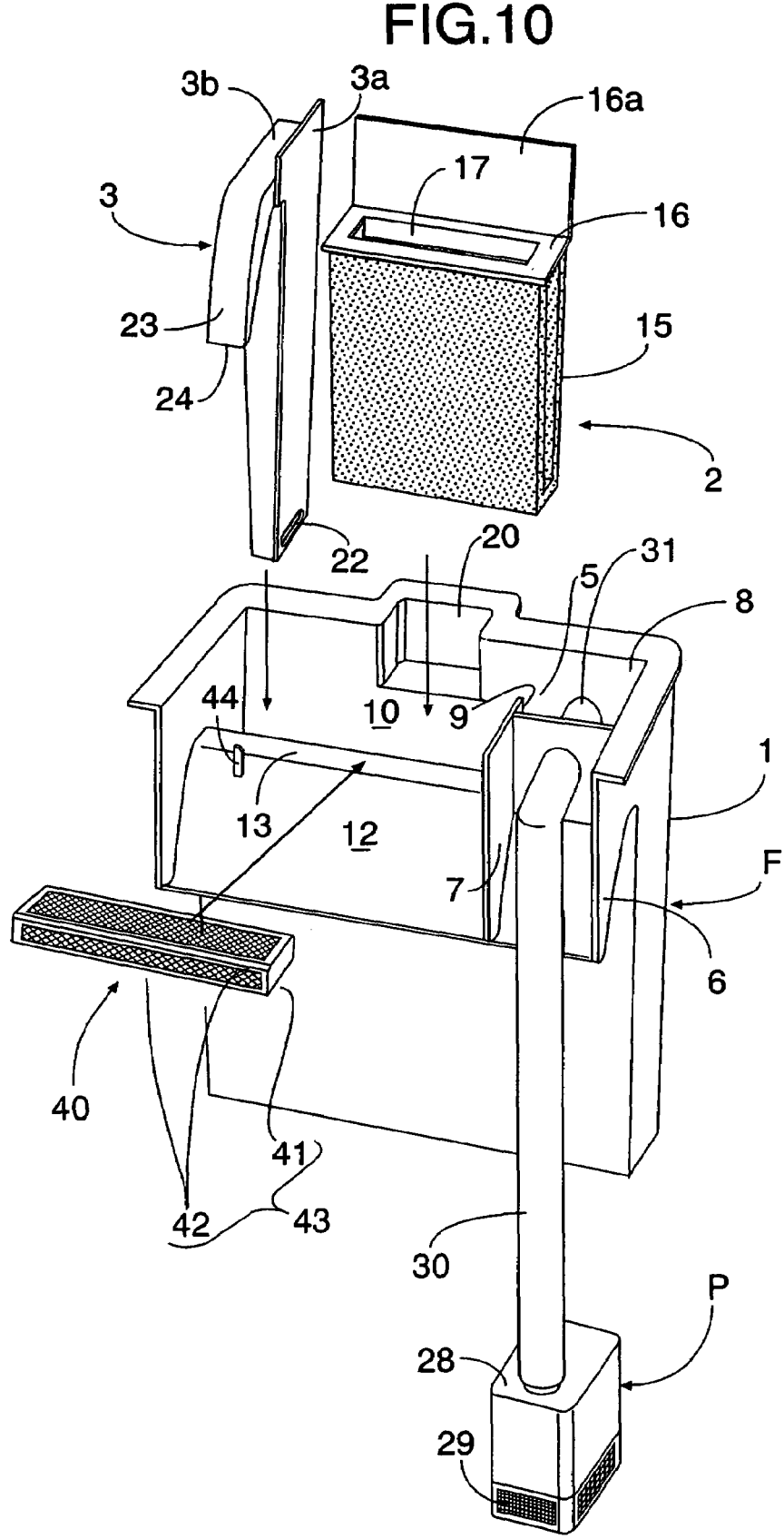
Figure 11:
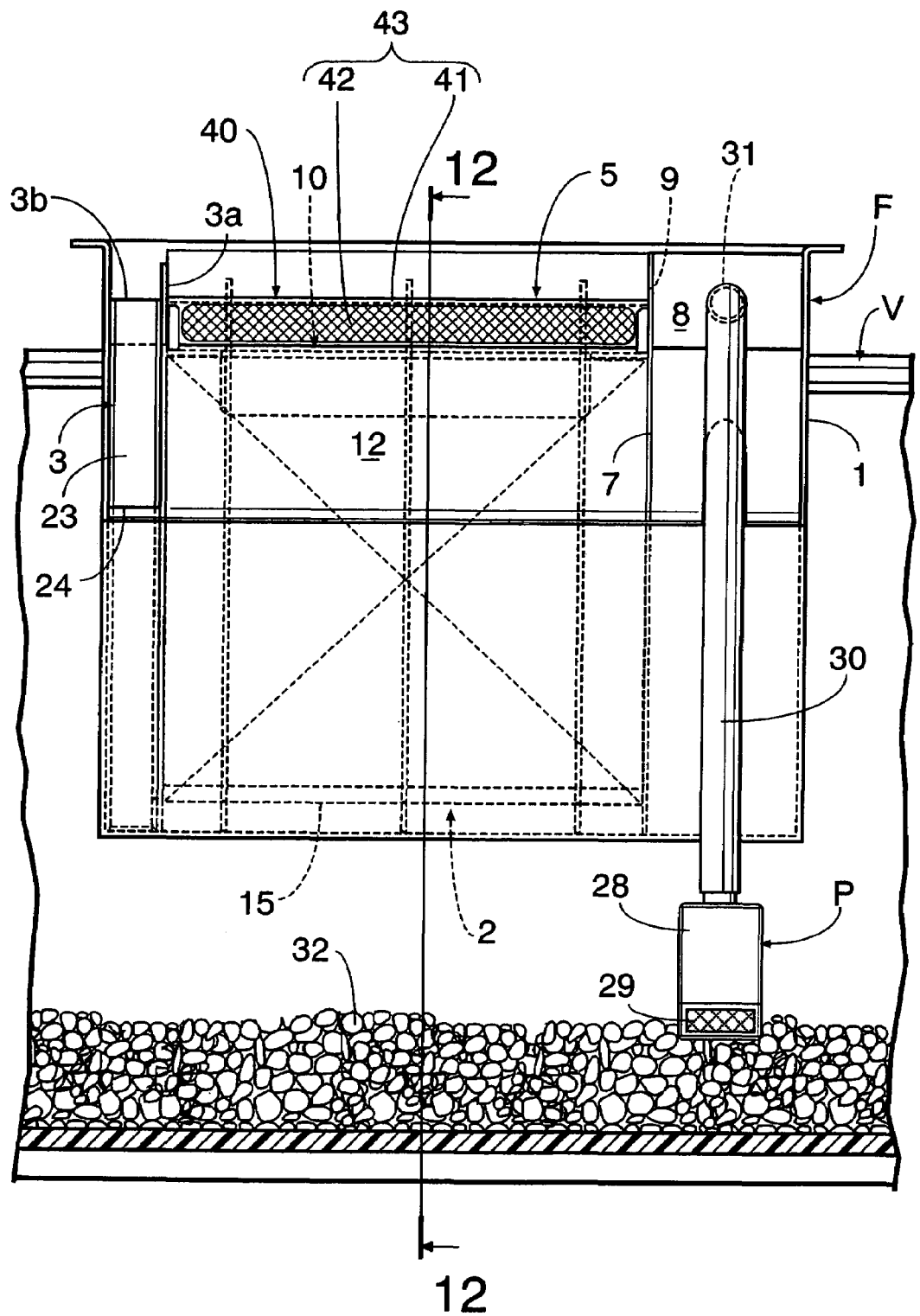
Figure 12:
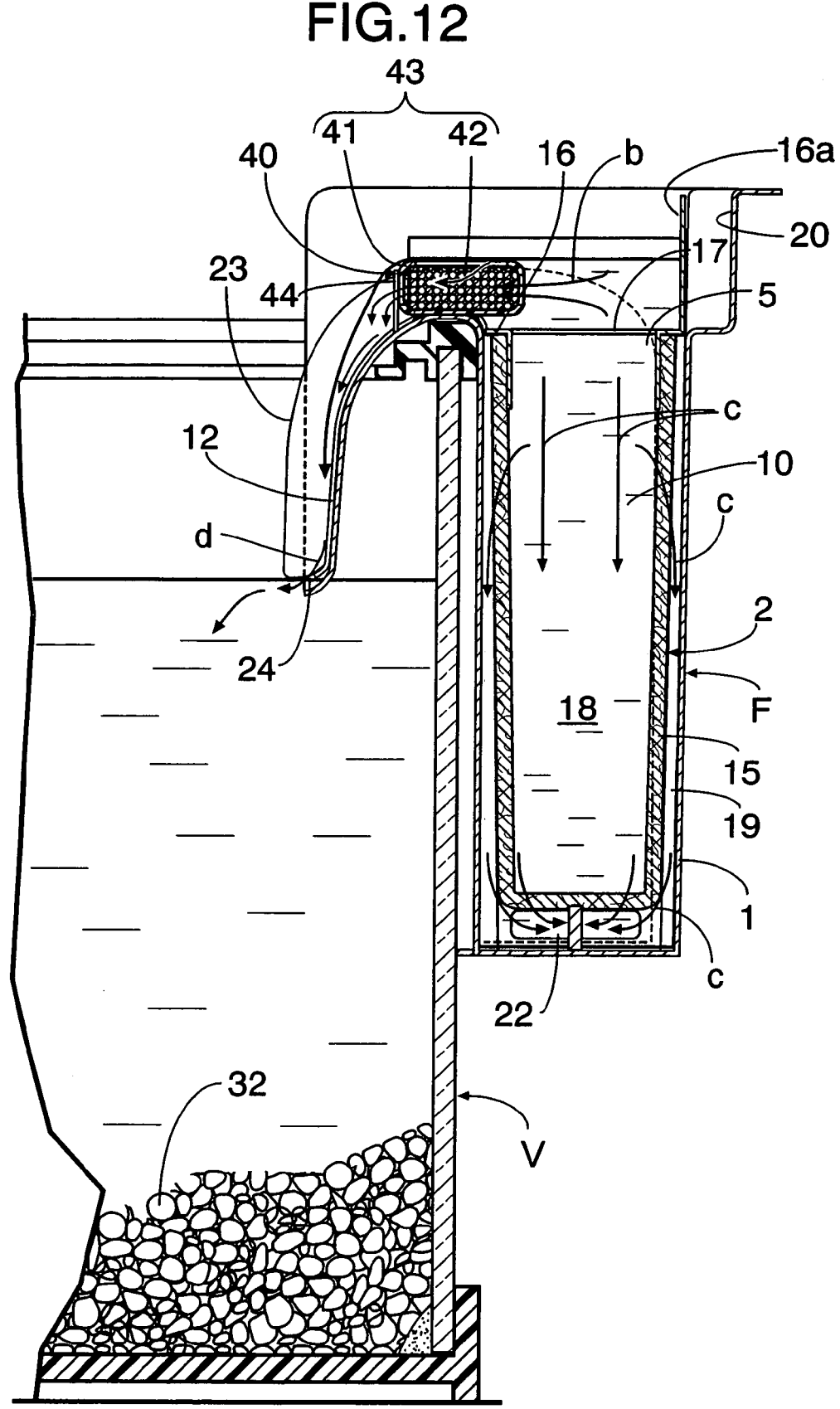

The nose portion 23 of the drain pipe 3 extends vertically, and a predetermined distance is provided vertically between an upper wall 3b of the drain pipe 3 and the drain port 24. When the filter device F is externally hitched on the aquarium V, a head H is defined between the upper wall 3b of the drain pipe 3 and the drain port 24, as shown in FIGS. 6 to 8, so that the purified water in the filter device F is returned into the aquarium V by a siphon effect provided by the head H.

As shown by a two-dot dashed line in FIGS. 5 and 7, an activated carbon pack 26 having activated carbon accommodated as a purifying agent therein is contained as required in the filter element unit 2 in the filter device F, i.e., in the unpurified water chamber 18. An upper portion of the activated carbon pack 26 is higher in level than the overflow wall 13 of the filter case 1, so that the unpurified water overflowing over the overflow wall 13 can be forcibly passed through the inside of the activated carbon pack 26.

The water pump P is used to pump the water in the aquarium V into the water storage chamber 8 in the filter device F, and has a pump device 28 which is provided at its lower portion with a suction port in which a strainer 29 is mounted, and at its upper portion with a discharge port. The water pump P is used in a state that it has been immersed in the water in the aquarium V. An inlet in a lower end of the water-feed pipe 30 is connected to the discharge port in the pump device 28. The water-feed pipe 30 extends upwards in the aquarium V with its upper portion curved, so that an outlet 31 in its upper end faces to an upper portion of the water storage chamber 8 in the filter device F. Therefore, the operation of the water pump P causes the unpurified water in the aquarium V to be pumped through the water-feed pipe 30 into the water storage chamber 8 and stored therein.

In FIGS. 1, 3, 6-9 and 11-12, reference character 32 represents Oiso pebbles that are laid on a bottom in the aquarium V. It should be noted that Oiso is a term commonly used in the field of breeding aquarium fish in Japan and means a mixture of white-colored pebbles and black-colored pebbles.

The operation of the first embodiment shown in FIGS. 1 to 8 will be described below.

In using the filtering apparatus, as shown in FIG. 1, the filter device F including the filter element unit 2 and the drain pipe 3 withdrawably mounted in the filter case 1 is externally hitched on the wall surface of the aquarium V, and the water pump P is placed in the aquarium V in the state in which it has been immersed in the water.

When the water pump P is now operated, the unpurified water in the aquarium V is pumped by the water pump P to flow through the water-feed pipe 30 into the water storage chamber 8 provided on the one side of the filter device F, as shown by an arrow a in FIGS. 5 and 6.

The water entering into the water storage chamber 8 is being accumulated in the chamber 8, while gradually raising the water level, and the water at a higher water level overflows over the flow-in port 9 in the upper edge of the partition wall, as shown by an arrow b in FIG. 5 and flows into the filtering chamber 10 defined in the central portion of the filter case 1. The water flowing into the filtering chamber 10 is divided into (1) water of a first flow which will overflow over the overflow wall 13, as it is, without being passed through the filter element, i.e., without being filtered, and will flow along the water-flow wall 12 back into the aquarium V, as shown by e in FIG. 7, and (2) water of a second flow which will be passed from the unpurified water chamber through the filter element unit 2 where it will be filtered, and then flow into the purified water chamber 19 and flow downwards within the chamber 19 and through the inlet 22 into the drain pipe 3, by undergoing suction due to the siphon effect caused by the head H, through the inlet 22 of the drain pipe 3, as shown by an arrow c in FIGS. 5 and 7.

The purified water of the second flow entering into the drain pipe 3 in the item (2) is returned into the aquarium V by the siphon effect provided by the head H at the nose portion 23, as shown by an arrow d in FIG. 8. On the other hand, the water of the first flow overflowing over the overflow wall 13 from the filtering chamber 10 in the item (1) is returned along the water-flow wall 12 directly into the aquarium V without being filtered, as shown by e in FIG. 7. Therefore, a portion (the water of the second flow) of the water flowing from the water storage chamber 8 into the filtering chamber 10 is passed through the filter element 15 where it is filtered, and the remainder (the water of the first flow) is returned into the aquarium V without being passed through the filter element 15. Moreover, the water passed through the filter element 15 has a flow resistance larger than that of the water not passed through the filter element 15 and hence, the flow rate and flow speed of the water passed through the filter element 15 are suppressed. As a result, the clogging of the filter element is reduced, and the propagation of aerobic microorganisms in the filter element 15 is promoted, whereby both of the water filtering effect provided in the filter element 15 and the organically water-purifying effect provided by the aerobic microorganisms can be enhanced.

In the first embodiment, rather than that pressurized water discharged from the water pump P is supplied directly to the filter element 15 to flow therethrough as in such a type of a conventional filtering apparatus (the water pump P is used only to pump water in the aquarium V into the water storage chamber 8), the water overflowing from the water storage chamber 8 and resident in the filtering chamber 10 is sucked through the inlet 22 by depressurizing the filtering chamber 10 by the siphon effect provided by the nose portion 23 of the drain pipe 3, and the sucked water is passed through the filter element 15 where it is filtered. Therefore, the water having a lower flow speed can be supplied equally all over the entire filtering surface of the filter element 15. This also can prevent the partial clogging of the filter element 15 and contribute largely to the promotion of the propagation of the aerobic microorganisms.

If the activated carbon pack is accommodated in the filtering chamber 10, as shown by a two-dot dashed line in FIGS. 5 and 7, the water flowing into the filtering chamber 10 can be purified by the activated carbon. In this case, the water (the water of the first flow) returned, as it is, to the aquarium without being filtered can be also purified by the activated carbon in addition to the water (the water of the second flow) passed through the filter element 15.

A second embodiment of the present invention will be described below with reference to FIGS. 9 to 12.

In the second embodiment, an activated carbon cassette 40 is detachably mounted in the filter case 1 provided in the first embodiment, and the same portions or components as in the first embodiment are designated by like reference characters.

The activated carbon cassette 40 is detachably supported on an overflow wall 13 above a filtering chamber 10 in the filter case 1 between a partition wall 7 partitioning the filtering chamber 10 and a water storage chamber 8 from each other and a sidewall (partition wall) 3a of a drain pipe 3. The activated carbon cassette 40 is comprised of a cassette case 43 comprising net plates 42 set on front, rear, upper and lower open faces of an elongated rectangular parallelepiped frame 41, and activated carbon filled in the cassette case 43. A stopper piece 44 is fixed to a side of the overflow wall 13, and the activated carbon cassette 40 on the overflow wall 13 is locked onto the overflow wall 13 by the stopper piece 44.

Therefore, according to the second embodiment, water overflowing over the overflow wall 13 in the filtering chamber 10 is passed through all over the inside of the activated carbon in the activated carbon cassette 40, whereby it is purified sufficiently and then returned to the aquarium V along a water-flow wall 12.

Thus, even the filtering apparatus according to the second embodiment provides the same function as in the first embodiment. More specifically, water flowing into the filtering chamber 10 is divided into water (water of a second flow) which will be passed through the filter element where it will be filtered, and water (water of a first flow) which will not be filtered, and these water flows are then returned into the aquarium V. The water which will be filtered is passed through the filter element unit 2 by a siphon effect provided by a head H defined at a nose portion 23 of the drain pipe 3, whereby it is filtered.

Although the embodiments of the present invention have been described, it will be understood that the present invention is not limited to the above-described embodiments, and various modifications in design may be made within the scope of the present invention defined in claims.

For example, another purifying agent such as MEIFAN-SHI™ may be used in place of the activated carbon used in each of the embodiments.

What is claimed is:

1. An outside-type filtering apparatus, comprising a filter device detachably supported in an externally hitched manner on a wall surface of an aquarium, and a water pump for pumping water stored in the aquarium into said filter device,
    said filter device includes a filter case defining a filtering chamber having an unpurified water chamber nested within a purified water chamber, the purified water chamber being in direct communication with the aquarium via a drain pipe, the drain pipe being detachably mounted in said filter case and including a sidewall and an inlet defined at a first end and a drain port defined at a second end, the inlet being defined in a first portion of the sidewall, facing a filter element and being in direct communication with the purified water chamber, the sidewall directly contacting the filter element to define a partition wall therebetween which isolates the filtering chamber and the drain pipe relative to each other in a water tight manner, and the drain port including a nose portion extending along a water-flow wall of the filter case and being in direct communication with the aquarium, wherein the water pumped from said water pump is stored in said filter device, and the stored water is filtered through the filter element by the depressurization of the inside of the filtering chamber caused by a siphon effect, and the filtered water is then returned into the aquarium.

2. The outside-type filtering apparatus according to claim 1, wherein said filter element separates the unpurified water chamber from the purified water chamber.

3. The outside-type filtering apparatus according to claim 2, wherein the filter element comprises a ceiling plate having an inlet defined therein for receiving the stored water therethrough.

4. The outside-type filtering apparatus according to claim 1, wherein the unpurified water chamber is in open communication with the aquarium along an upper surface of said water-flow wall.

5. The outside-type filtering apparatus according to claim 1, wherein a purifying agent holding cassette is disposed between the unpurified water chamber and the aquarium.

6. The outside-type filtering apparatus according to claim 5, wherein the purifying agent holding cassette includes activated carbon.

7. An outside-type filtering apparatus, comprising a filter device detachably supported in an externally hitched manner on a wall surface of the aquarium, and a water pump for pumping water stored in the aquarium into said filter device,
    said filter device includes a filter case defining a filtering chamber having an unpurified water chamber nested within a purified water chamber, the purified water chamber being in direct communication with the aquarium via a drain pipe, the drain pipe being detachably mounted in said filter case and including a sidewall and an inlet defined at a first end and a drain port defined at a second end, the inlet being defined in a first portion of the sidewall, facing a filter element and being in direct communication with the purified water chamber, the sidewall directly contacting the filter element to define a partition wall therebetween which isolates the filtering chamber and the drain pipe relative to each other in a water tight manner and the drain port including a nose portion extending along a water-flow wall of the filter case and being in direct communication with the aquarium, wherein the water pumped from said water pump is stored in said filter device, and the stored water is divided into a first flow which is returned into the aquarium as remaining unfiltered, and a second flow which is filtered through the filter element by the depressurization of the filtering chamber by a siphon effect and then returned into the aquanum.

8. The outside-type filtering apparatus according to claim 7, wherein said filter device includes a filter case, which is provided, in an inside thereof, with a water storage chamber in which water pumped by said water pump is stored, the filtering chamber abutting the water storage chamber to receive therein water overflowing from said water storage chamber, and a portion of the received water is permitted to overflow and returned into the aquarium as said first flow, and the remaining water is filtered through said filter element as said second flow, and a drain pipe for dropping the filtered remaining water into the aquarium by sucking by the siphon effect.

9. The outside-type filtering apparatus according to claim 8, wherein the filter element separates the unpurified water chamber from the purified water chamber.

10. The outside-type filtering apparatus according to claim 9, wherein the filter element comprises a ceiling plate having an inlet defined therein for receiving the stored water therethrough.

11. The outside-type filtering apparatus according to claim 7, wherein the filter element separates the unpurified water chamber from the purified water chamber.

12. The outside-type filtering apparatus according to claim 11, wherein the filter element comprises a ceiling plate having an inlet defined therein for receiving the stored water therethrough.

13. The outside-type filtering apparatus according to claim 7, wherein the unpurified water chamber is in open communication with the aquarium along an upper surface of said water-flow wall.

14. The outside-type filtering apparatus according to claim 7, wherein a purifying agent holding cassette is disposed between the unpurified water chamber and the aquarium.

15. The outside-type filtering apparatus according to claim 14, wherein the purifying agent holding cassette includes activated carbon.

* * * * *